(12) United States Patent
Greenwald et al.

(10) Patent No.: US 6,591,720 B1
(45) Date of Patent: Jul. 15, 2003

(54) DISK BRAKE LATHE VIBRATION ATTENUATOR

(75) Inventors: Christopher L. Greenwald, Concord, NH (US); Jeffrey P. Hastings, Hanover, NH (US)

(73) Assignee: Pro-Cut Licensing, LLC, West Lebanon, NH (US)

( * ) Notice: Subject to any disclaimer, the term of this patent is extended or adjusted under 35 U.S.C. 154(b) by 0 days.

(21) Appl. No.: 10/309,837

(22) Filed: Dec. 4, 2002

(51) Int. Cl.$^7$ ................................................ B23B 5/02
(52) U.S. Cl. .............................. 82/112; 82/163; 74/574
(58) Field of Search ........................ 82/112, 163, 162; 408/47, 143; 409/141; 74/574

(56) References Cited

U.S. PATENT DOCUMENTS

| | | |
|---|---|---|
| 3,710,661 A | 1/1973 | Mitchell ..................... 82/38 A |
| 4,531,434 A * | 7/1985 | Vasquez ...................... 82/112 |
| 6,101,911 A | 8/2000 | Newell et al. ................. 82/112 |
| 6,227,085 B1 * | 5/2001 | Vasquez, Jr. ................. 82/112 |
| 2001/0011490 A1 | 8/2001 | Vasquez, Jr. ................. 82/112 |

FOREIGN PATENT DOCUMENTS

JP              362024051 A  *  2/1987  ................. 82/112

* cited by examiner

*Primary Examiner*—Willmon Fridie, Jr.
(74) *Attorney, Agent, or Firm*—Michael J. Wens; Jeffrey E. Semprebon

(57) ABSTRACT

A vibration attenuator for a disk brake lathe has two friction pads, each having a pad recess with a distal wall and a proximal wall. When the pads are placed against a brake disk, the recesses are placed over raised heads of fasteners that affix cutting tools of the lathe to adjustable tool holders. When the tool holders are moved radially outwards across the brake disk, the fastener raised heads engage the recess proximal walls and move the pads along with the cutting tools, and also serve to couple the pads with the cutting tools to dampen vibrations. Similarly, when the tool holders are moved radially inwards, the fastener raised heads engage the recess distal walls to move the pads along with the cutting tools. A U-shaped member having a tension spring extending between two legs on which the pads are mounted forcibly engages the pads with the brake disk.

6 Claims, 4 Drawing Sheets

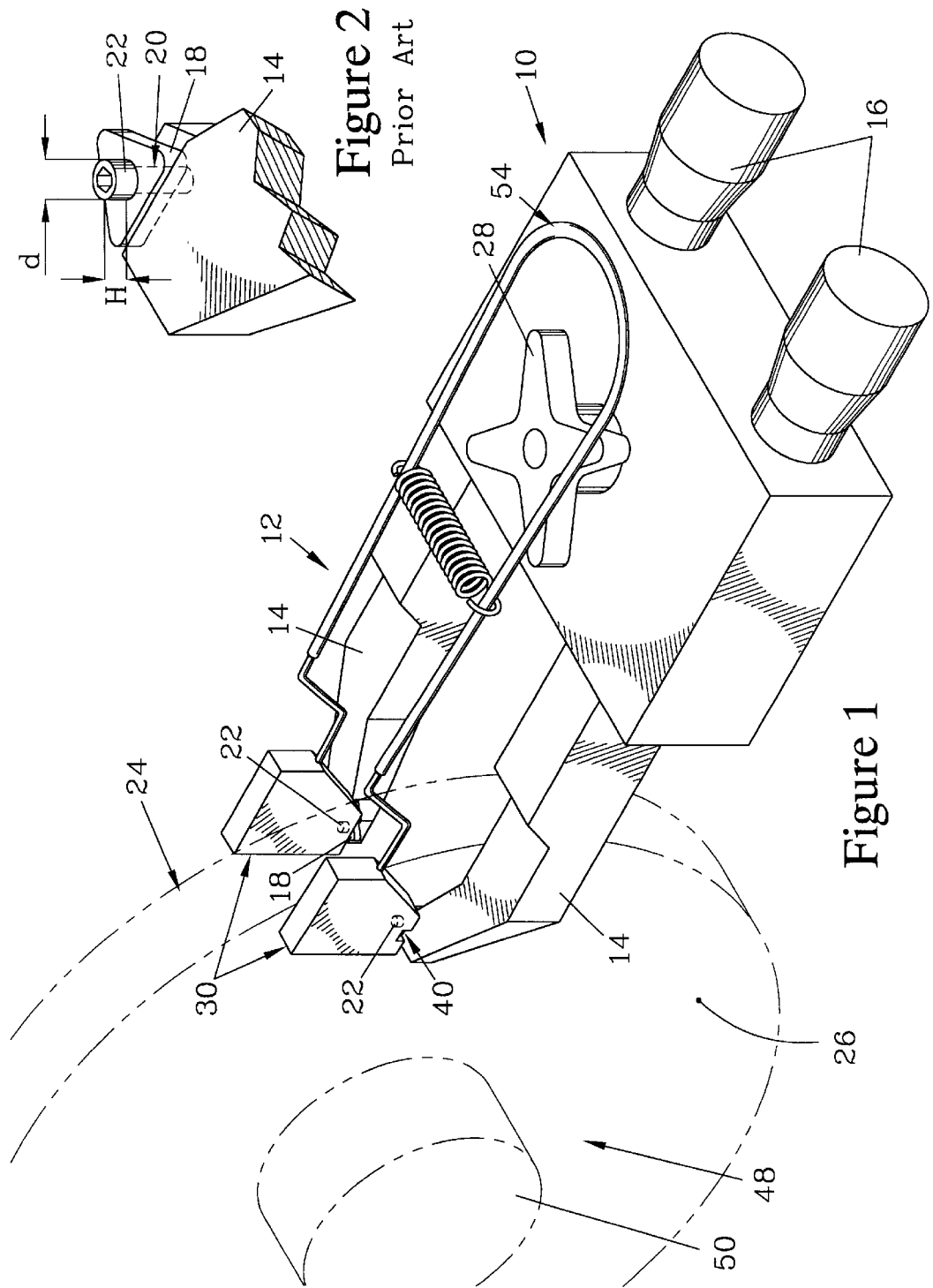

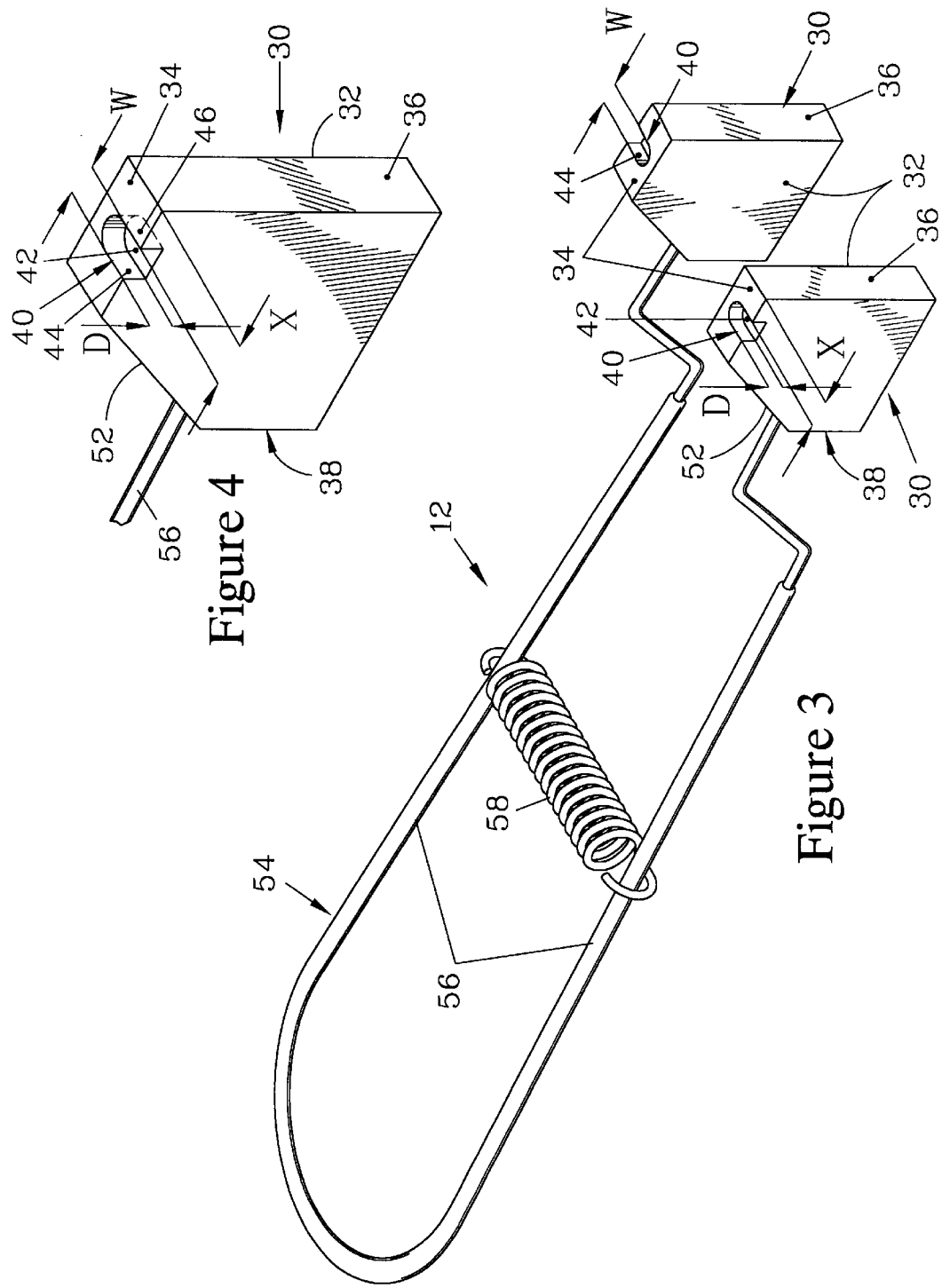

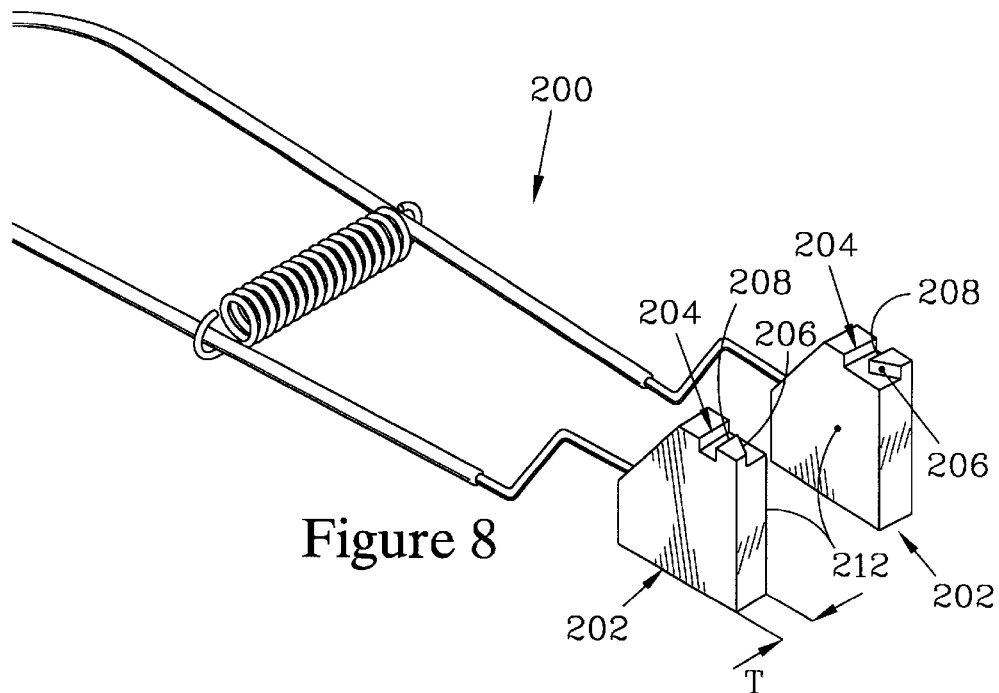
Figure 8
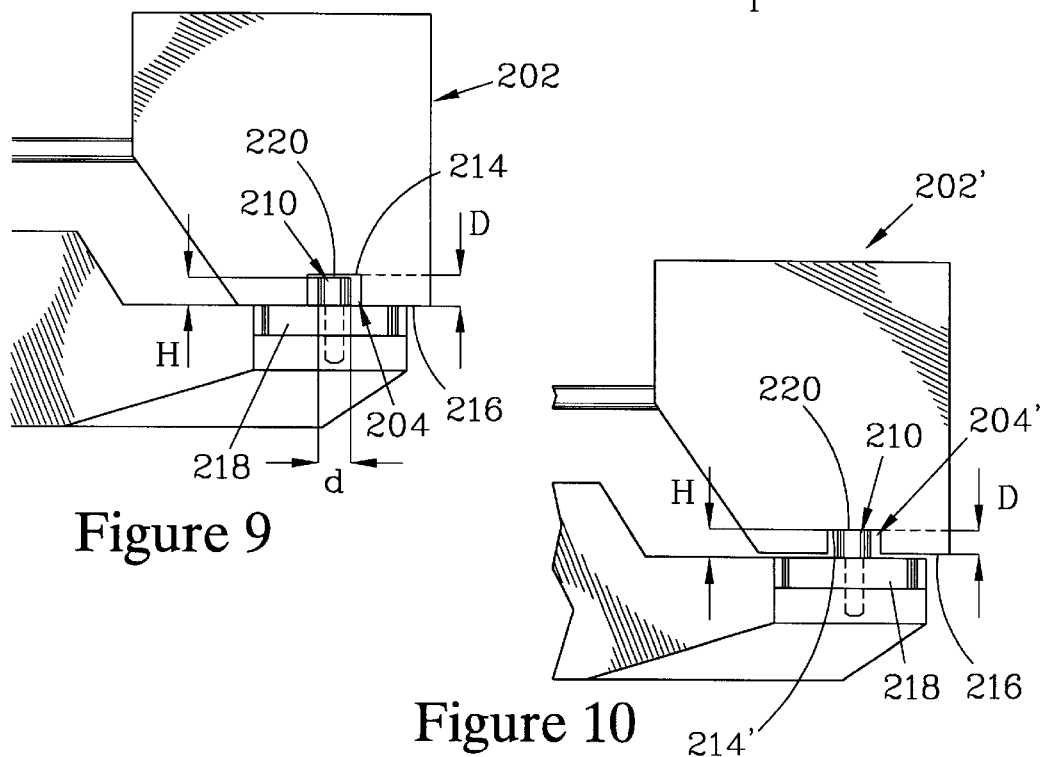
Figure 9
Figure 10

1

DISK BRAKE LATHE VIBRATION ATTENUATOR

FIELD OF THE INVENTION

The present invention is for a vibration attenuator for use with a disk brake lathe to reduce noise and vibrations resulting from machining the surfaces of a brake disk by the lathe.

BACKGROUND OF THE INVENTION

Automotive brake disks are periodically resurfaced by a disk brake lathe in order to maintain adequate operation. The disk brake lathe typically has a pair of cutting tools, each attached to a tool holder by a fastener to allow replacement when the cutting tool becomes worn. The tool holders position the cutting tools against the surfaces of the brake disk to establish a desired depth of cut, and then maintain the cutting tools in position as they are drawn across the disk surfaces while the lathe rotates the brake disk in order to machine the disk surfaces. Typically, the desired depth of cut is set at a position near the center of a radius of the disk surface while the brake disk is rotated, and the cutting tools are then moved toward the center of the brake disk to begin the machining process. The cutting tools are then moved radially outwards to resurface the brake disk.

Vibrations caused by the cutting action of the cutting tools on the disk surfaces need to be attenuated, both to reduce chattering of the cutting tools to assure that the resulting machined disk surfaces are sufficiently planar for proper operation, and to reduce undesirable noise in the machining environment. One approach to reducing vibrations has been the use of friction pads which are biased against the disk surfaces and engage the cutting tools, the tool holders, and/or the fasteners.

U.S. Pat. No. 3,710,661 teaches a vibration dampener where friction pads engage either the tool holders or the cutting tools. The friction pads are positioned and biased against the disk surfaces by a scissors-shaped spring, which in turn is pivotably mounted to a cutting head assembly of the lathe. Since the friction pads and spring are mounted to the cutting head assembly on which the tool holders are also mounted, the friction pads move with the tool holders as the cutting head assembly is moved to position the cutting tools near the center of the brake disk and to subsequently advance the cutting tools radially across the disk surfaces. The pivotable mounting allows the spring and friction pads to be pivoted away from the cutting tools to allow the cutting tools to be replaced. Having the vibration dampener attached to the cutting head assembly may make it difficult to position the friction over the disk surfaces. Furthermore, having the spring pivotably mounted can create interference problems if the vibration dampener is to be used on a lathe, such as those made by Pro-Cut International, the assignee of the present application, which has a lock knob mounted to the top of the cutting head assembly. The lock knob serves to secure the tool holders in position once the depth of cut has been set, and typically is too large to allow a spring such as employed in the '661 vibration dampener to be pivoted past the lock knob.

U.S. Pat. No. 4,531,434 teaches a vibration attenuator which does not require that the spring be mounted to the cutting head assembly. In the '434 attenuator, friction pads are provided with pins which engage either the cutting tools or the tool holders as the cutting tools are moved radially outwards, this engagement serving to move the friction pads along with the cutting tools as the brake disk is resurfaced. The friction pads are mounted on a U-shaped spring assembly which is independent of the cutting head assembly. However, it has been found that the particular geometry constraints of the '434 vibration attenuator limit its effectiveness for many lathe configurations. Furthermore, the use of pins extending from the pads may limit usefulness when the clearance above the cutting tools is restricted by a brake caliper bracket associated with the brake disk.

To overcome the limitations of the '434 vibration attenuator, U.S. Pat. No. 6,227,085 teaches a vibration attenuator where the friction pads are provided with protruding engagement nubs which engage raised heads of the fasteners used to affix the cutting tools to the tool holders when the cutting tools are moved radially outwards. In addition to serving to move the friction pads along with the cutting tools as the brake disk is resurfaced, this engagement is purported to provide superior reduction of vibrations. The '085 patent reports that the particular geometry of the vibration attenuator is well suited for use with disk brake lathes sold by Pro-Cut.

A limitation of both the '434 and '085 vibration attenuators is that they only move the friction pads along with the cutting tools when the cutting tools are moved radially outwards. When the cutting tools are moved radially inwards, the pins become disengaged from the cutting tools or tool holders in the case of the '434 vibration attenuator, or the engagement nubs become disengaged from the raised head of the fasteners in the case of the '085 vibration attenuator. In either case, when the cutting tools are moved radially inwards, the friction pads of the vibration attenuator become disengaged and do not move with the tool holders, requiring the vibration attenuator to be repositioned. This requirement is inconvenient in situations where the cutting tools are advanced more than once across the disk surfaces. This can occur if the first pass of the cutting tools over the disk surfaces is found insufficient to provide planar disk surfaces, or if one of the disk surfaces is deeply scored by wear. In such cases, after the cutting tools have been advanced radially outwards, they are moved radially inwards and set with an increased depth of cut, then advanced again across the disk surfaces. The unidirectional limitation of the '434 and '085 vibration attenuators requires that the vibration attenuator be repositioned after the cutting tools are moved radially inwards, adding an additional step to the procedure.

U.S. Publication US 2001/0011490 is a continuation-in-part of the application which issued as the '085 patent, and teaches a nub configuration which is designed for a disk brake lathe sold by Pro-Cut. The nub is configured to affirmatively hold the nub in contact with the raised head of the fastener of the cutting tool as the tool is advanced across the disk surface. The nub also contacts an angled surface on the tool holder, which is reported to move the nub into engagement with the raised head when the disk is rotated. The operation of the '490 vibration attenuator is dependent on a particular configuration of the tool holders of the disk brake lathe, and thus a particular vibration attenuator would appear to be dedicated to a particular model of lathe.

Thus, there is a need for a vibration attenuator for disk brake lathes which overcomes the deficiencies of the above referenced devices.

SUMMARY OF THE INVENTION

The present invention is for an improved vibration attenuator for a disk brake lathe. The attenuator provides a more flexible coupling mechanism for assuring that the attenuator tracks cutting tools of the lathe in a manner appropriate to reduce the vibration of the cutting tools as they traverse disk surfaces of a brake disk. Furthermore, the tracking is bi-directional and allows the attenuator to be positioned by the action of the cutting tools without requiring that the attenuator be affixed to a cutting head assembly used for advancing the cutting tools. Similarly, the design of the attenuator is such that its advancement with the cutting tools is not dependant on the details of the geometry of the cutting head assembly, its tool holders, or the associated cutting tools.

The vibration attenuator of the present invention is designed for use with a disk brake lathe having a cutting head assembly which has a pair of cutting tools. Each of the cutting tools is mounted to an associated tool holder and attached thereto by a fastener. The fastener has a fastener raised head having a head sidewall and a head top. The lathe is provided with means for moving the cutting head assembly such that the tool holders traverse a path that is substantially radial with respect to the brake disk.

The attenuator has a pair of friction pads, each having a disk-engaging surface which, when in service, is brought into frictional contact with a disk surface of the brake disk. Each of the pads is bounded by a pad lower surface which resides between a pad proximal surface and a pad distal surface. Each of the pads contains a pad recess in the pad lower surface. The pad recess is bounded, in part, by a recess distal wall and a recess proximal wall. These recess walls initiate at the pad lower surface and terminate at a recess bottom which is spaced apart from the pad lower surface by a recess depth D, and the recess distal wall and the recess proximal wall are separated by a recess width W of sufficient size to accommodate one of the fastener raised heads. The depth D should be sufficient to assure extended contact between the recess walls and the head sidewall of the raised head, but not necessarily the head top of the raised head. In some embodiments, the recess could extend completely through the pad, but such would limit the useful life of the resulting vibration attenuator as the pads wear.

When the pad recess is placed over the fastener raised head, the fastener raised head engages the recess proximal wall when the cutting head assembly is moved to advance the cutting tools radially outwards across the disk surfaces. This engagement serves to move the friction pad along with the cutting tool and the tool holder associated with the fastener, as well as serving to couple the friction pad with the cutting tool to dampen vibrations. Similarly, when the cutting head assembly is moved radially inwards, the fastener raised head engages the recess distal wall to move the friction pad along with the cutting tool and the tool holder.

It is preferred that a setback X of the recess distal wall from the pad distal surface be provided that is sufficiently large as to maintain each of the pads in contact with its associated one of the disk surfaces when the cutting tools have reached the periphery of the disk. Preferably, the setback X should also be maintained small enough to avoid interference of the pads with a wheel hub associated with the brake disk as the cutting tools approach the wheel hub.

Spring means for forcibly engaging the disk-engaging surfaces of the friction pads with the disk surfaces are provided. One preferred embodiment of the spring means is to employ a U-shaped member having a pair of legs, with each of the legs mounting into the pad proximal surface of one of the pads, and having a tension spring extending between the legs.

BRIEF DESCRIPTION OF THE FIGURES

FIG. 1 is an isometric view of a prior art cutting head assembly of a disk brake lathe, with a vibration attenuator which forms one embodiment of the present invention installed thereover. The cutting head assembly has a pair of cutting tools, each mounted to an adjustable tool holder by a fastener having a raised head. The vibration attenuator has a pair of friction pads, each of which has a recess configured to be engaged by one of the raised heads when the cutting tool assembly is moved radially outwards or radially inwards with respect to a brake disk, shown in phantom.

FIG. 2 is a detail view showing one of the fasteners which affixes one of the cutting tools to one of the tool holders of the cutting head assembly shown in FIG. 1.

FIG. 3 is an isometric view of the vibration attenuator shown in FIG. 1, which is shown in an inverted position to more clearly show the details of the recesses.

FIG. 4 is an enlarged isometric view of one of the friction pads of the vibration attenuator shown in FIGS. 1 and 3, showing further details of the recess.

FIG. 8 is an isometric view of a vibration attenuator which forms another embodiment of the present invention that is similar to the vibration attenuator shown in FIGS. 5–7. The pads of this embodiment have guide surfaces which facilitate sliding the recesses into position with respect to the fastener raised heads.

FIG. 9 is a partial view showing the relationship between the depth of the recess and the height of the fastener raised head for the embodiment shown in FIG. 8. In this embodiment, the recess depth is greater than the height of the fastener raised head, and a pad lower surface of the pad engages the cutting tool.

FIG. 10 is a partial view similar to that of FIG. 9, showing an alternative embodiment where the recess depth is less than the height of the fastener raised head. In this embodiment, a recess bottom engages a head top of the fastener raised head, and the pad lower surface is spaced apart from the cutting tool.

DETAILED DESCRIPTION OF THE PREFERRED EMBODIMENTS

Figure 5:
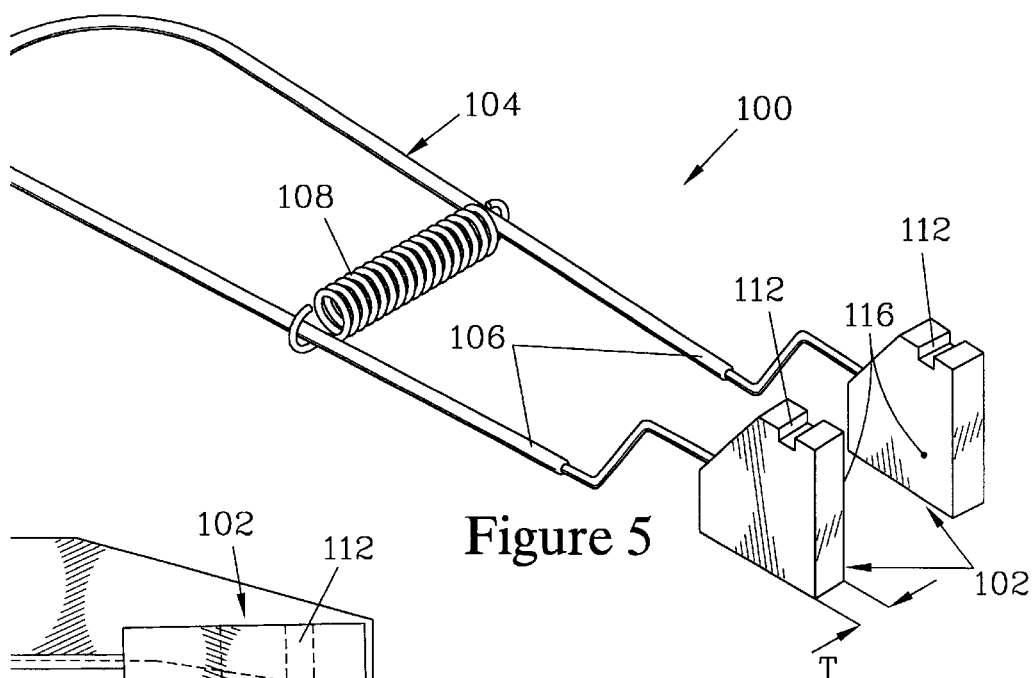
FIG. 5 is an isometric view of a vibration attenuator which forms another embodiment of the present invention. This vibration attenuator has recesses which traverse the thickness of the pads, allowing the vibration attenuator to be positioned more readily.

FIG. 1 is an isometric view showing a prior art cutting head assembly 10 of a disk brake lathe (the remainder of which is not shown) such as the disk brake lathe described in U.S. Pat. No. 6,101,911 for which the present invention is suitable. A vibration attenuator 12 of the present invention is shown engaged with the cutting head assembly 10. The cutting head assembly 10 has a pair of adjustable tool holders 14, and FIG. 2 shows a portion of one of the tool holders 14 in greater detail. The separation between the tool holders 14 is controlled by a pair of graduated dials 16. A pair of cutting tools 18 are attached to the tool holders 14 and are affixed thereto by fasteners 20 (one of which is shown in FIG. 2), each having a raised head 22 with a height H. Frequently the raised head 22 is substantially cylindrical in form, having a diameter d. The graduated dials 16 allow the cutting tools 18 to be positioned with a desired depth of cut for machining a brake disk 24 (shown in phantom). The cutting tools 18 engage disk surfaces 26 (only one of which is viewable) which are to be machined to return the brake disk 24 to its operating specification. A lock knob 28 on the cutting head assembly 10 is turned to secure the tool holders 14 in position once the cutting tools 18 have been adjusted with respect to the brake disk 24.

FIG. 3 illustrates details of the vibration attenuator 12 shown in FIG. 1. In FIG. 3, the vibration attenuator 12 is shown in an inverted position to better illustrate its structure. The vibration attenuator 12 has a pair of friction pads 30, each of which has a disk-engaging surface 32 which makes frictional contact with one of the disk surfaces 26. Each of the friction pads 30 is further bounded by a pad lower surface 34 which resides between a pad distal surface 36 and a pad proximal surface 38.

The pad lower surfaces 34 are each provided with a pad recess 40 having a depth D and a width W sufficient to accommodate at least a portion of one of the raised heads 22. The recess 40 is configured to accommodate the raised head 22 even after substantial wear on the disk-engaging surface 32. The recess 40 in this embodiment is partially bounded by a recess bottom 42, and the separation between the recess bottom 42 and the pad lower surface 34 defines the recess depth D. This recess depth D is not critical to the design; however, it should be great enough to allow sufficient contact between the raised head 22 and the recess 40 to counteract torques created when the brake disk 24 rotates, which might otherwise disengage the friction pad 30 from the raised head 22. It is not necessary for the depth D to be as large as the height H of the raised head 22.

As better shown in FIG. 4, each of the recesses 40 is also bounded, in part, by a recess proximal wall 44 and a recess distal wall 46. The separation between the recess proximal wall 44 and the recess distal wall 46 defines the recess width W. When the raised head 22 has a diameter d, the recess width W is selected to be somewhat greater than the diameter d. The recess proximal wall 44 is engaged by one of the raised heads 22 as the cutting tools 18 are advanced radially outwards across the disk surfaces 26. This engagement moves the friction pads 30 radially outwards with the cutting tools 18. When the cutting tools 18 reach the extremities of the brake disk 24, the cutting tools 18 may be drawn back to a central hub region 48 of the brake disk 24. The friction pads 30 track the motion of the cutting tools 18, since the recess distal walls 46 are engaged by the raised heads 22 as the cutting tools 18 are moved radially inwards.

The separation between the pad distal surface 36 and the recess distal wall 46 defines a setback X. The setback X must be sufficient to withstand the forces of the raised head 22 as the cutting tool 18 is drawn toward the hub region 48 of the brake disk 24. It is preferred for the setback X to have a minimum value sufficient to maintain the pads 30 in contact with the disk surfaces 26 when the cutting tools 18 have reached and/or slightly overshot the periphery of the brake disk 24. To achieve such, the setback X should be selected with respect to the cutting tool 18 such that, when the raised head 22 engages the recess distal wall 46, the pad distal surface 36 extends somewhat beyond the portion of the cutting surface of the cutting tool 18 which is active in causing removal of material from the disk surface 26 as the cutting tool 18 is advanced across the brake disk 24.

Similarly, the setback X should be maintained small enough to reduce the likelihood of interference of the pads 30 with a wheel hub 50 as the cutting tools 18 approach the wheel hub 50 when the brake disk 24 is being resurfaced while remaining in place on a vehicle. Such interference can be avoided in most cases by setting a practical upper limit for the setback X of about 5 mm (0.2 inches). A setback X of about 3.00 mm (0.118 inches) has been found effective for typical cutting tools 18. For some configurations of the tool holders 14, it may also be preferred for a lower section 52 of the pad proximal surface 38 to be sloped toward the recess 40 to reduce the likelihood of interference between the pad 30 and the tool holder 14.

In the vibration attenuator 12, spring means for forcibly engaging the disk-engaging surfaces 32 of the friction pads 30 with the disk surfaces 26 are provided by a U-shaped handle 54 having a pair of legs 56. Each of the legs 56 passes through the proximal surface 38 of one of the friction pads 30 and is engaged in a pad passage (not shown) sized to frictionally hold the leg 56 in the friction pad 30. A tension spring 58 is connected between the two legs 56 and is sized such that, when the pads 30 are placed on the disk surfaces 26 (as shown in FIG. 1), there is a compressive load applied to the brake disk 24 to create a frictional force between the friction pads 30 and the disk surfaces 26 as the brake disk 24 rotates.

While the recess illustrated in FIGS. 3 and 4 traverses less than the full width of the pad, the recess can traverse the full thickness of the pad. FIG. 5 is an isometric view of a vibration attenuator 100 which, like the vibration attenuator 12, has a pair of friction pads 102 which attach to a U-shaped handle 104. The U-shaped handle 104 has a pair of legs 106 which in turn are each embedded in one of the pads 102. A tension spring 108 is attached to the legs 106 and causes the pads 102 to forcibly engage a brake disk 110 (as shown in FIG. 7). In this embodiment, each of the pads 102 is again provided with a recess 112. However, in this embodiment the recess 112 traverses the thickness T of the pad 102. This simplifies the fabrication of the pads 102 and also simplifies positioning the pads 102 on the disk 110 such that the recesses 112 engage fastener raised heads 114, shown in FIGS. 6 and 7.

Figure 6:
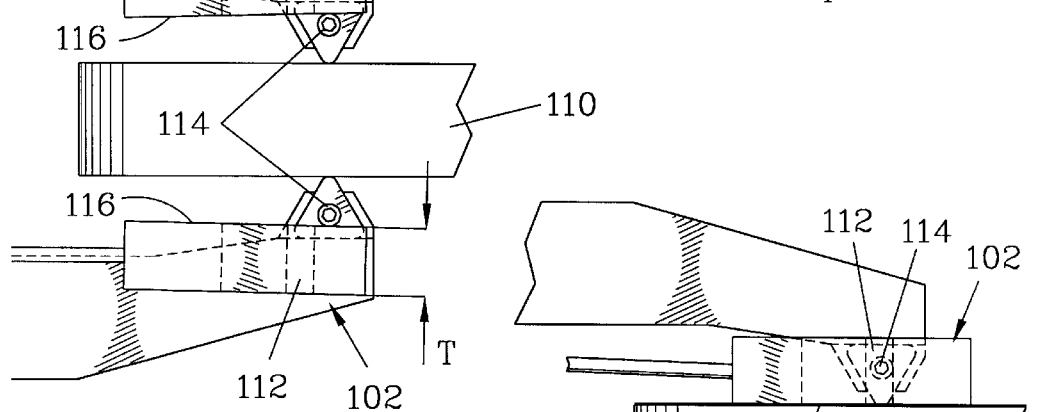
FIGS. 6 and 7 are partial top views of the vibration attenuator shown in FIG. 5, showing how the vibration attenuator can be slid into position. When the recesses are aligned with fastener raised heads, the pads snap into engagement with the brake disk, as shown in FIG. 7.
Figure 7:
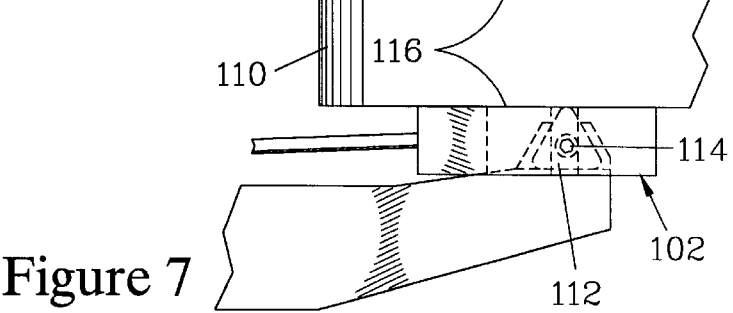

The partial top views of FIGS. 6 and 7 illustrate how having the recess 112 traverse the thickness T of the pad 102 can assist in positioning the vibration attenuator 100. In this embodiment, the vibration attenuator 100 can be placed over the fastener raised heads 114 by separating the pads 102 such that disk-engaging surfaces 116 of the pads 102 straddle the fastener raised heads 114 as shown in FIG. 6. As the pads 102 are advanced across the fastener raised heads 114, the fastener raised heads 114 can enter the recesses 112 to allow the disk-engaging surfaces 116 of the pads 102 to be brought into frictional contact with the brake disk 110, as shown in FIG. 7. In fact, after a period of wear, the embodiment illustrated in FIGS. 1, 3 and 4 may well result in the pad recesses 40 traversing the residual thickness of the pads 30.

FIG. 8 illustrates another embodiment of the invention, a vibration attenuator 200 which shares many of the features of the vibration attenuator 100 illustrated in FIGS. 5–7. The vibration attenuator 200 again has a pair of pads 202 that each has a recess 204 which traverses the thickness T of the pad 202. In this embodiment, each pad 202 is also provided with a guide surface 206 which intersects a recess distal wall 208 of the recess 204. The guide surfaces 206 facilitate placing the pads 202 over fastener raised heads 210 (one of which is shown in FIG. 9) using the technique discussed above and illustrated in FIGS. 6 and 7. To preserve the ability of the friction pad 202 to be moved radially inwards by the fastener raised head 210, the guide surface 206 should be configured such that the recess distal wall 208 is spaced apart from a disk-engaging surface 212 of the pad 202 by somewhat less than the diameter d of the fastener raised head 210. Preferably, the recess distal wall 208 is spaced apart from the disk-engaging surface 212 by less than one half the diameter d.

FIG. 9 is a partial side view showing one of the recesses 204 and one of the fastener raised heads 210. In this embodiment, the recess 204 has a recess bottom 214 that is separated from a pad lower surface 216 by a recess depth D which is greater than a height H of the fastener raised head 210. When the recess depth D is greater than the height H, the pad lower surface 216 engages a cutting tool 218 associated with the fastener raised head 210. The recess bottom 214 is separated from a head top 220 of the fastener raised head 210.

FIG. 10 is a partial side view of an alternative pad 202' having a recess 204' with a recess bottom 214' that is separated from the pad lower surface 216 by a recess depth D which is less than the height H. With the alternative pad 202', the recess bottom 214' engages the head top 220 of the fastener raised head 210, and the pad lower surface 216 is spaced apart from the cutting tool 218. In such cases, the pad lower surface 216 need not have a substantially planar configuration as illustrated, and could be curved, faceted, or otherwise configured. The pad lower surface 216 could be configured to suit a particular configuration of tool holder.

While the novel features of the present invention have been described in terms of particular embodiments and preferred applications, it should be appreciated by one skilled in the art that substitution of materials and modification of details obviously can be made without departing from the spirit of the invention.

What we claim is:

1. A vibration attenuator for use with a disk brake lathe designed for resurfacing a brake disk having a pair of disk surfaces, the disk brake lathe having, a pair of cutting tools, each mounted to an associated tool holder by a fastener having a fastener raised head of fastener height H, the tool holders each adjustably positioning the cutting tool mounted thereto with respect to one of the disk surfaces, and a cutting head assembly which supports the tool holders and is movable to move the tool holders substantially radially with respect to the brake disk, the vibration attenuator comprising:

a pair of friction pads each having a disk-engaging surface, which can be positioned to engage one of the disk surfaces of the brake disk, and a pad lower surface having a pad recess therein, said pad recess being bounded in part by a recess distal wall and a recess proximal wall initiating at said pad lower surface, said recess distal wall and said recess proximal wall being separated by a recess width W sufficient to accommodate one of the fastener raised heads, said recess proximal wall being configured to be forcibly engaged by the fastener raised head when the cutting head assembly is moved to advance the tool holders substantially radially outwards, such forcible engagement causing said friction pad to move with the tool holder associated with the fastener, and said recess distal wall being configured to be forcibly engaged by the fastener raised head when the cutting head assembly is moved to move the tool holders substantially radially inwards, such forcible engagement causing said friction pad to move with the tool holder associated with the fastener; and spring means for forcibly engaging said friction pads with the disk surfaces.

2. The vibration attenuator of claim 1 wherein said spring means further comprises:

a U-shaped member having a pair of legs, on each of which one of said friction pads is mounted; and a tension spring extending between said legs.

3. The vibration attenuator of claim 1 wherein said recess is partly bounded by a recess bottom that is separated from said pad lower surface by a recess depth D, said recess depth D being at least as great as the fastener height H.

4. The vibration attenuator of claim 1 wherein said recess is partially bounded by a recess bottom that is separated from said pad lower surface by a recess depth D, said recess depth D being less than the fastener height H.

5. The vibration attenuator of claim 1 wherein each of said pair of friction pads is partly bounded by a pad distal surface that is separated from said recess distal wall by a setback X that is no greater than about 5 mm (0.2 inches).

6. The vibration attenuator of claim 5 wherein said setback X measures about 3 mm (0.1 inches).

* * * * *